US006581731B2

United States Patent
Chen

(10) Patent No.: US 6,581,731 B2
(45) Date of Patent: Jun. 24, 2003

(54) AUTONOMOUS GENERATION BRAKE ASSEMBLY

(76) Inventor: Shui-Jung Chen, No. 88-1, Sec. 1, Kuang Fu Rd., Sanchung City, Taipei Hsien (TW)

(*) Notice: Subject to any disclaimer, the term of this patent is extended or adjusted under 35 U.S.C. 154(b) by 0 days.

(21) Appl. No.: 09/903,666

(22) Filed: Jul. 13, 2001

(65) Prior Publication Data

US 2003/0010584 A1 Jan. 16, 2003

(51) Int. Cl.[7] ................................................. B60L 7/00
(52) U.S. Cl. ........................................................ 188/164
(58) Field of Search ................................. 188/158, 159, 188/161, 164; 310/77

(56) References Cited

U.S. PATENT DOCUMENTS

| 4,713,567 A | * | 12/1987 | Fey et al. ................ 188/164 |
| 4,864,173 A | * | 9/1989 | Even ....................... 188/158 |
| 5,107,156 A | * | 4/1992 | Jaun et al. ................ 188/171 |
| 5,986,370 A |   | 11/1999 | Cheng |
| 6,084,325 A | * | 7/2000 | Hsu ....................... 188/161 |
| 2002/0079759 A1 | * | 6/2002 | Chen ....................... 310/75 C |

* cited by examiner

Primary Examiner—Christopher P. Schwartz
Assistant Examiner—Xuan Lan Nguyen
(74) Attorney, Agent, or Firm—Birch, Stewart, Kolasch & Birch, LLP

(57) ABSTRACT

An autonomous generation brake assembly comprises a hub acting as a first rotor and defines a receiving space therein by a peripheral wall. A plurality of permanent magnets are arranged alternatively along inner face of the peripheral wall. A stator is received in the receiving space of the hub and includes an armature coils corresponding to the permanent magnets of the hub, and a magnetic coils. A second rotor is rotationally received in the hub and located within the stator for working with the magnetic coils thereby generating eddy current therein for being attracted by the magnetic coils of the stator.

6 Claims, 6 Drawing Sheets

AUTONOMOUS GENERATION BRAKE ASSEMBLY

FIELD OF THE INVENTION

The present invention relates to a brake assembly, and more particularly to an autonomous generation brake assembly in which an armature coil and a permanent magnet is incorporated for generating electricity at one hand, and a magnetic coil is incorporated for generating magnetic force for braking an exterior rotor.

DESCRIPTION OF THE PRIOR ART

A conventional autonomous generation brake generally includes a dynamo mounted on a spindle of a sport bike, a rectifier and a braking system enclosing the dynamo. When the wheel is rotated, the dynamo is actuated thereby generating electricity. The electricity then flows through the rectifier, and then directs to a magnetic coil thereby generating magnetic force which in turn attracts a drum enclosing the magnetic coils thereby stopping the rotation of the drum.

U.S. Pat. No. 5,986,370 to Cheng discloses a typical autonomous generation brake, as shown in FIGS. 5 and 6 of the attached drawings. An armature coils and a magnetic coils are mounted to first and second stators (A, B), respectively, i.e. there are configured by different members. The first stator (A) in which the armature coils mounted is configured by the armature coils (a3) sandwiched between first and second braking members (a1, a2). While the second stator (B) in which the magnetic coils mounted is configured by a magnetic coils (b3) sandwiched between third and fourth braking members (b1, b2) which is larger then the first and second braking members (a1, a2) in dimension. Then the first and second stators (A, B) are assembled to first and second rotors (C, D) to complete the assembly. Even the autonomous generation brake disclosed in the '370 patent does achieve to its intended purpose, the complicated structure inevitably increase its cost. In addition, this brake assembly is too large to incorporate to the bicycle.

SUMMARY OF THE INVENTION

It is an objective of this invention to provide an autonomous brake assembly in which a stator including an armature coils and a magnetic coils. The armature coils works with a first rotor for including electrical current, and the magnetic coils is energized to generate magnetic force to hold down an interior second rotor.

In order to achieve the objective set forth, an autonomous generation brake assembly in accordance with the present invention comprises a hub acting as a first rotor and defines a receiving space therein by a peripheral wall. A plurality of permanent magnets are arranged alternatively along inner face of the peripheral wall. A stator is received in the receiving space of the hub and includes an armature coils corresponding to the permanent magnets of the hub, and a magnetic coils. A second rotor is rotationally received in the hub and located within the stator for working with the magnetic coils thereby generating eddy current therein for being attracted by the magnetic coils of the stator.

According to another aspect of the present invention, wherein the stator is configured by a plurality of yoke iron shims thereby decreasing the manufacturing cost. In addition, the braking capacity can be readily adjusted by the dimension of the yoke iron shims.

According to another aspect of the present invention, wherein the magnetic coils can be configured firstly, then assembled to cores formed on the stator thereby reducing the labor cost.

BRIEF DESCRIPTION OF PREFERRED EMBODIMENT

Other objects and advantages of the present invention will become apparent from the following detailed description of the preferred embodiments thereof taken in conjunction with the accompanying drawings wherein.

Figure 1:
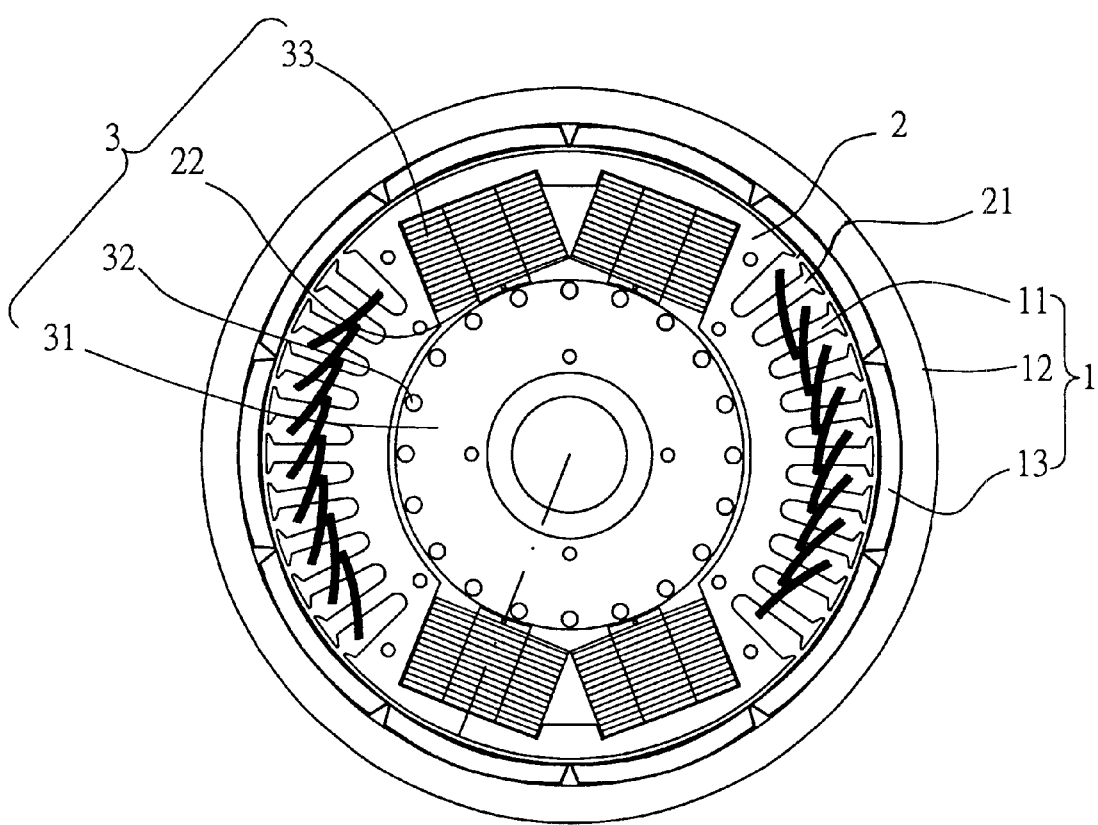
FIG. 1 is a top view of an autonomous generation brake assembly in accordance with the present invention.
Figure 2:
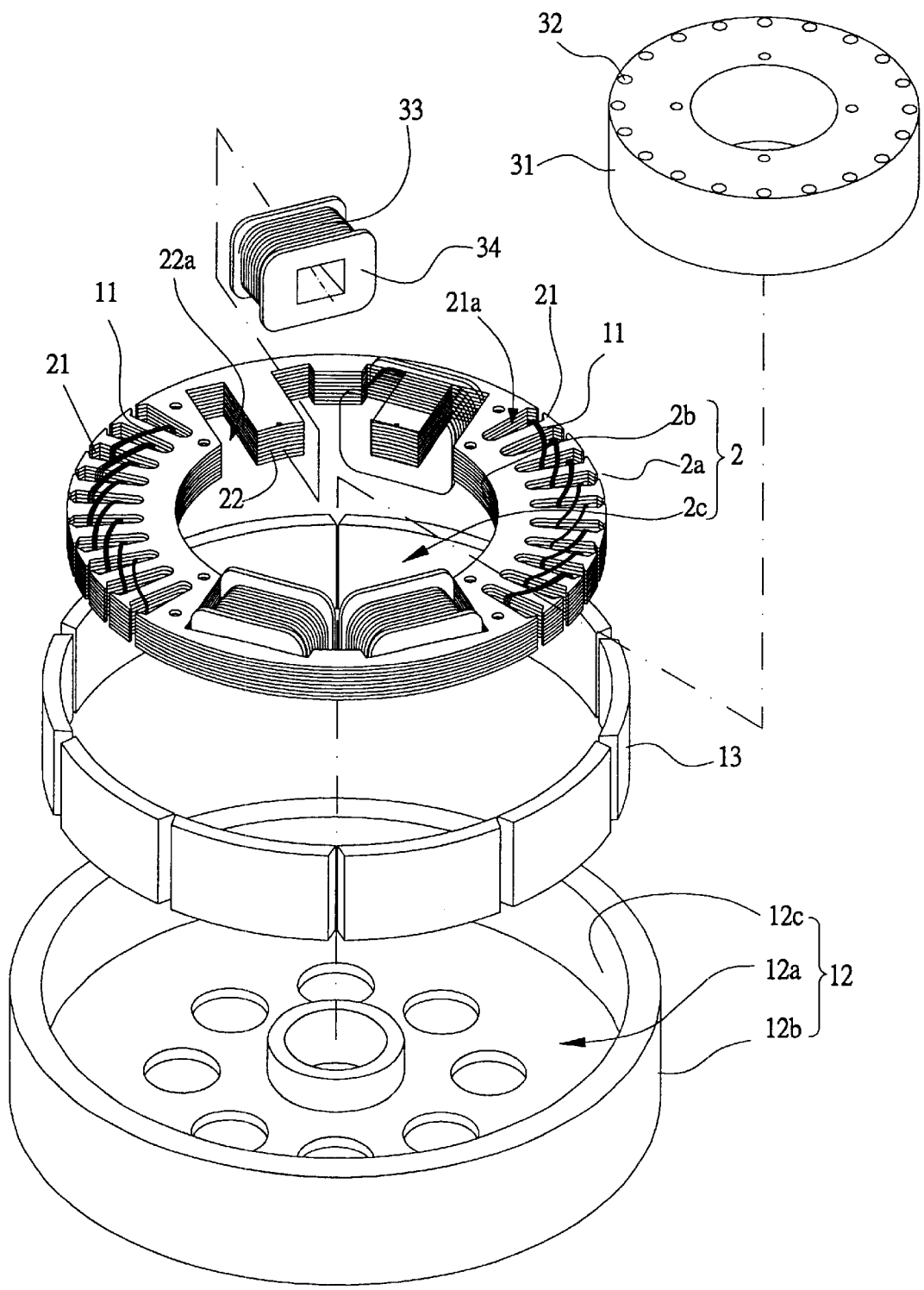
FIG. 2 is an exploded view of FIG. 1.
Figure 3A:
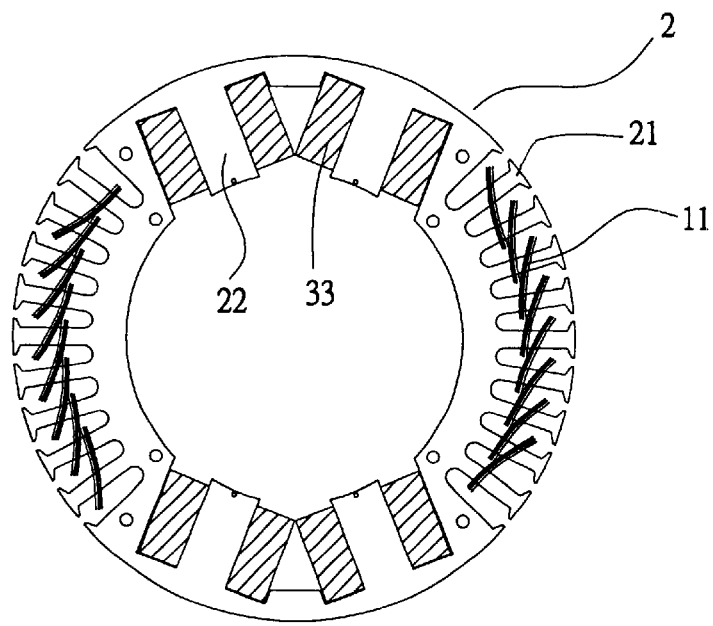
Figure 4:
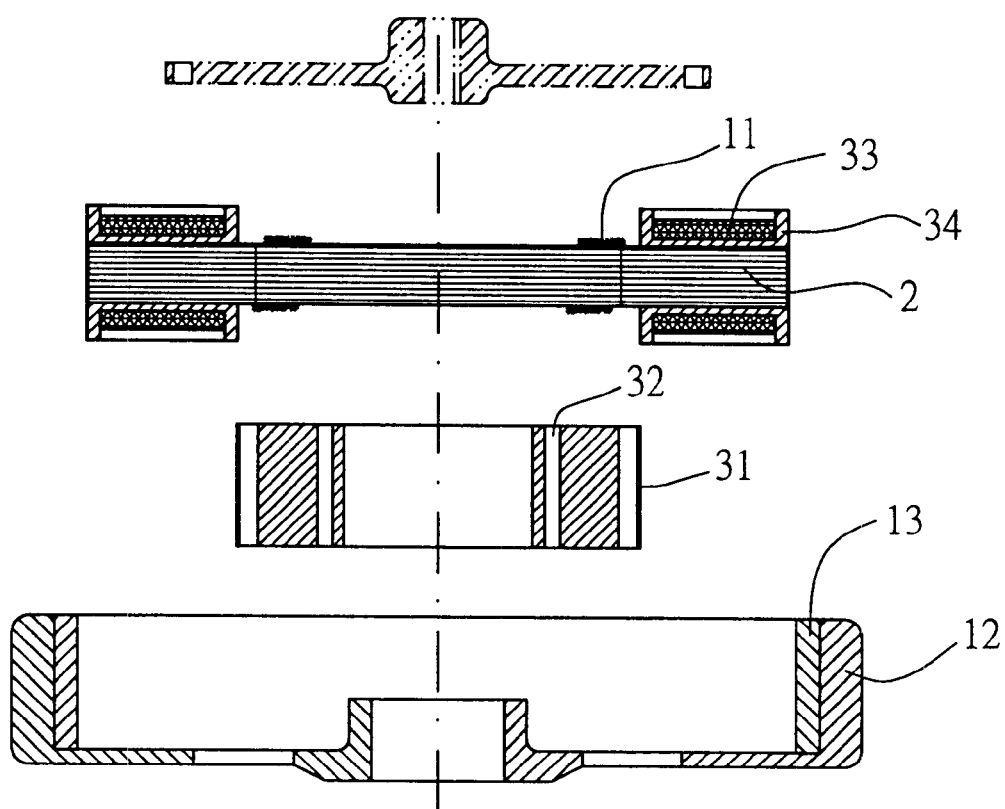
Figure 5:
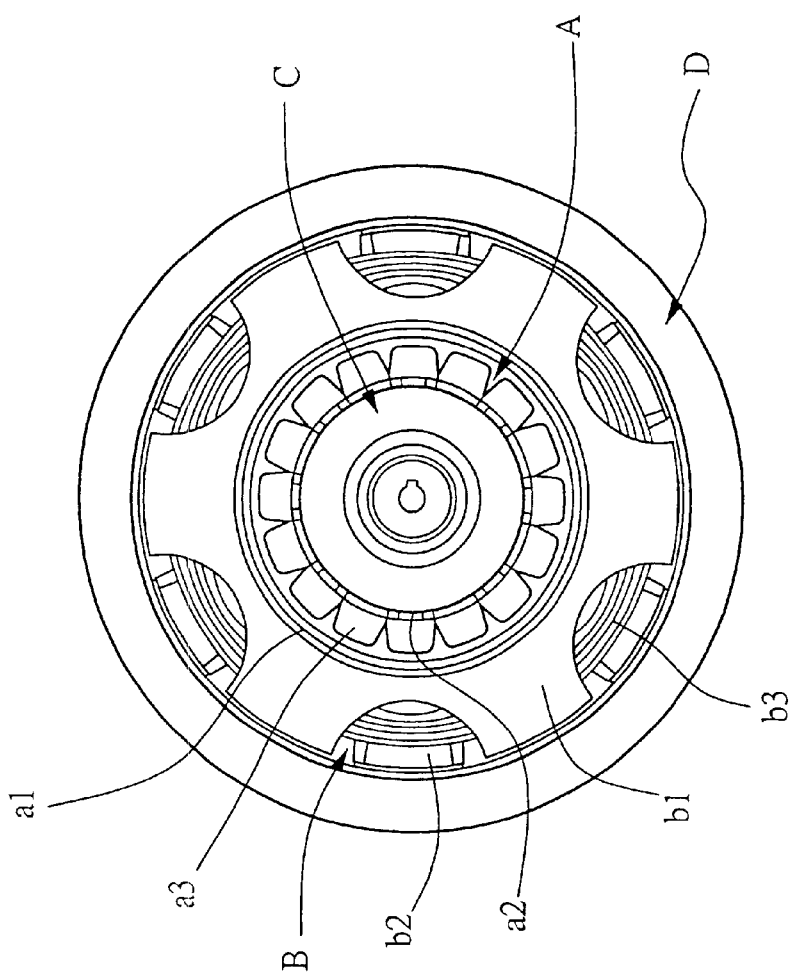
Figure 6:
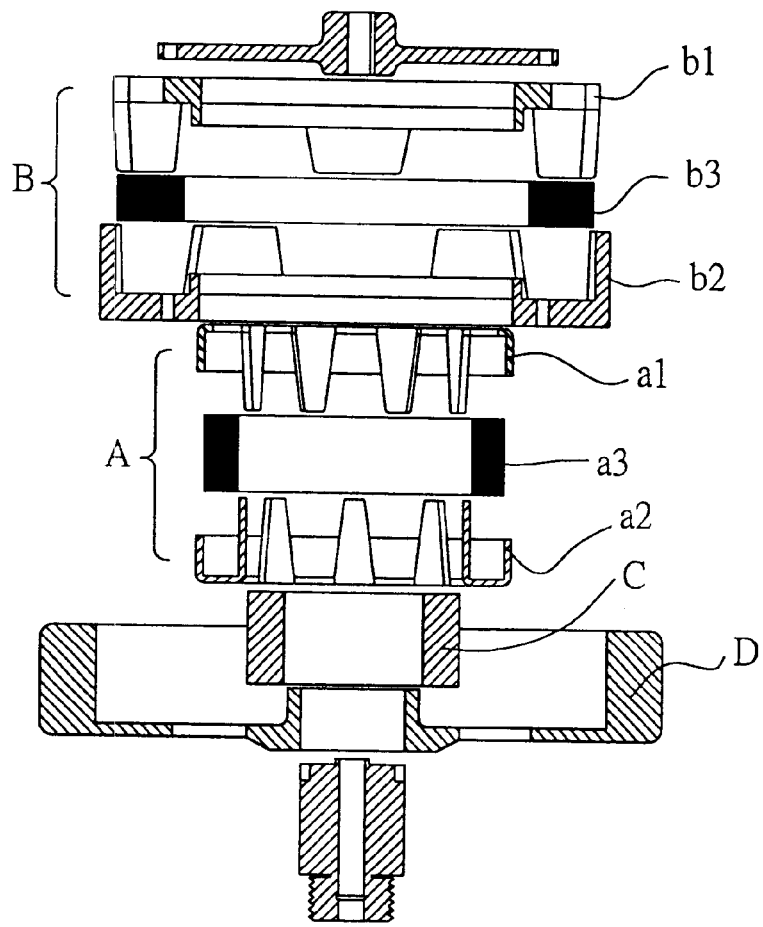

FIGS. 3A & B are assembling view of a stator and an armature coils in accordance with the present invention;

FIG. 4 is a side view of FIG. 2;

FIG. 5 is a top view of a prior art autonomous generation brake assembly; and FIG. 6 is an exploded view of FIG. 5.

DETAILED DESCRIPTION OF PREFERRED EMBODIMENTS

Referring to FIGS. 1 to 4, an autonomous generation brake assembly in accordance with the present invention comprises a hub 12 acting as a first rotor and defines a receiving space 12a therein by a peripheral wall 12b. A plurality of permanent magnets 13 are arranged alternatively along inner face 12c of the peripheral wall 12b. The permanents 13 are arranged such that north and south poles of the magnets 13 are alternatively arranged.

Figure 3B:
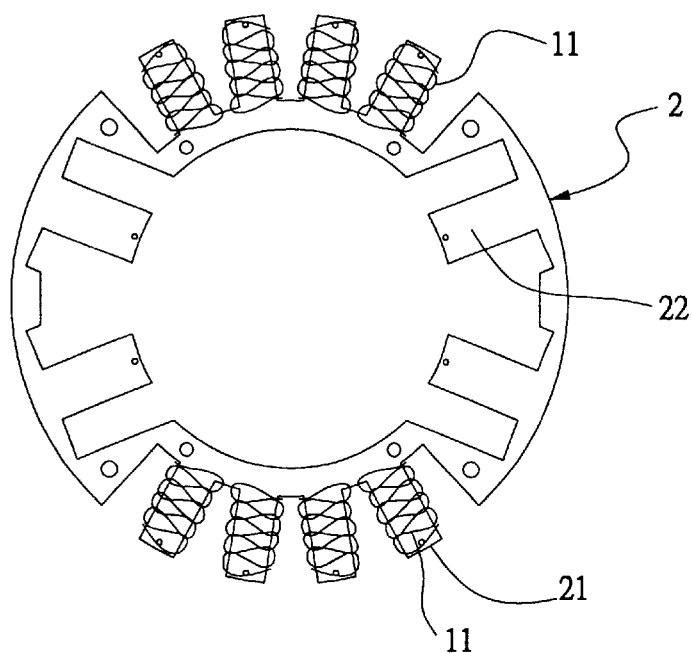

A stator 2 configured by a plurality of yoke iron shims is received in the receiving space 12a of the hub 12 and includes an armature coils 11 corresponding to the permanent magnets 13 of the hub 12, and a magnetic coils 33 spaced from the armature coils 11 arranged on a plurality of first posts 21 defined by slots 21a extending from an outer rim 2a of the stator. The stator further includes an inner rim 2b with a plurality of second posts 22 formed thereon. Each second post 22 is defined by a pair of recesses 22a extending from the inner rim 2b of the stator 2. The stator 2 further defines an opening 2c in a center thereof. As clearly shown in FIG. 2, the armature coils 11 is directed toward the permanent magnets 13 assembled on the hub 1, while the magnetic coil 33 is directed inwardly toward the opening 2c. The armature coils 11 can be arranged in single phase (as shown in FIG. 3A), dual-phase (as shown in FIG. 3B), three-phase and four-phase.

According to a preferred embodiment of the present invention, the magnetic coils 33 is preferably mounted on a rack 34 before it is assembled to the second posts 22. This can be advantageously since the labor cost can be largely reduced as compare to winding coils directly onto the second posts 22.

A second rotor 32 is rotationally received in the hub 12 and located within the opening 2c of the stator 2 for working with the magnetic coils 33 thereby generating eddy current therein for being attracted by the magnetic coils 33 of the stator 2. The second rotor 32 includes an outer surface 31 directed toward the magnetic coils 33. Accordingly, when the magnetic coils 33 is energized, magnetic force can be generated such that the second rotor 32 will be induced to create eddy current and magnetic field. By this arrangement, rotation of the second rotor 32 can be impaired when the magnetic coils 33 is energized.

According to a preferred embodiment of the present invention, the stator 2 is configured by a plurality of yoke iron shims enclosed by an aluminum cage. By the arrangement, when the second rotor 32 cuts through a magnetic field generated by the magnetic coils 33, eddy current can be easily induced.

When the magnetic coils 33 is energized by a dc current, the magnetic flux is generated accordingly. The magnetic flux flows through the gap and enters the second rotor 32. The magnetic flux then flows back to an adjacent second post 22 to establish a complete loop. By this arrangement, when the second rotor 32 is rotated as the user pedals the gears (not shown), the magnetic flux is changed such that eddy current is generated within the second rotor 32. As a magnetic field accompanied with the eddy current is opposite to the magnetic field of the electromagnetic force generated by the magnetic coils 33 thereby the second rotor 32 becomes a working load of the magnetic coils 33 so as to stop the rotation of the second rotor 32.

In order to properly control the braking torque, i.e. the eddy current, the dc current which energizes the magnetic coils 33 has to be accurately controlled. A rectifier (not shown in Figures) is used to rectify and convert the AC current generated by the armature coils 11 of stator 2 into DC current. Then the DC current is further controlled in a controlling circuit and finally flows to the magnetic coils 33 on the stator 2. As a result, the braking torque can be accurately controlled.

Furthermore, the capacity of the induced current generated by the armature coils 11, and the eddy current generated by the magnetic field created by the magnetic coils 33 can be readily adjusted by selecting the diameter and thickness of the yoke iron shims of the stator 2. The reacting force is proportional to the density of the magnetic flux, i.e. $F=K*B^2*A$, wherein F is the reacting force, B is the density of the magnetic flux, and A is the effective area. When the turns of the magnetic coils 34 is concentrated, the magnetic flux B is increased considerably. As a result, the increase of the flux density can compensate the loss of the effective area. In light of this, even the overall dimension of the braking device is reduced, the braking force is not comprised accordingly. Accordingly, the braking device provided by the present invention can be economically increased, while the material cost is considerably reduced.

While specific illustrated embodiment has been shown and described, it will be appreciated by those skilled in the-art that various modifications, changes, and additions can be made to the invention without departing from the spirit and scope thereof as set forth in the following claims.

We claim:

1. An autonomous generation brake assembly, comprising:

a hub acting as a first rotor and defining a receiving space therein by a peripheral wall, a plurality of permanent magnets arranged alternatively along inner face of said peripheral wall;

a stator received in said receiving space of said hub including first group of armature coils corresponding to said permanent magnets of said hub, and a second group of magnetic coils; and a second rotor received in said hub and located within said stator for working with said second group of coils thereby generating eddy current therein for being attracted by said magnetic coils of said stator.

2. The autonomous generation brake assembly as recited in claim 1, wherein said stator defines an inner rim and an outer rim, at least a pair of recesses defined in said inner rim and forming a post therebetween, a pre-assembled magnetic coils assembled onto said post for generating magnetic force when said magnetic coils are energized.

3. The autonomous generation brake assembly as recited in claim 1, wherein said armature coils can be arranged in single-phase, dual-phase, three-phase, or four phase.

4. The autonomous generation brake assembly as recited in claim 1, wherein said stator includes an armature coils adjacent to said magnetic coils and arranged on said outer rim of said stator.

5. The autonomous generation brake assembly as recited in claim 1, wherein said armature coils generates electricity when working with magnetic force generated from said permanent magnets of said hub.

6. The autonomous generation brake assembly as recited in claim 1, wherein said first group of armature coils and said second group of magnetic coils are disposed simultaneously on said stator.

* * * * *